(12) United States Patent
Impero

(10) Patent No.: US 9,126,551 B2
(45) Date of Patent: Sep. 8, 2015

(54) SHOCK ABSORBER FOR MOTOR VEHICLES

(76) Inventor: Pasquale Impero, Casalnuovo di Napoli (IT)

( * ) Notice: Subject to any disclaimer, the term of this patent is extended or adjusted under 35 U.S.C. 154(b) by 0 days.

(21) Appl. No.: 14/006,591

(22) PCT Filed: Mar. 20, 2012

(86) PCT No.: PCT/IB2012/051332
§ 371 (c)(1),
(2), (4) Date: Sep. 20, 2013

(87) PCT Pub. No.: WO2012/127417
PCT Pub. Date: Sep. 27, 2012

(65) Prior Publication Data
US 2014/0008925 A1   Jan. 9, 2014

(51) Int. Cl.
*B60R 19/34* (2006.01)
*F16F 7/12* (2006.01)

(52) U.S. Cl.
CPC .. *B60R 19/34* (2013.01); *F16F 7/12* (2013.01)

(58) Field of Classification Search
CPC .................. C12Q 2565/301; C12Q 2565/501; C12Q 2565/907; C12Q 1/6825; C12Q 2565/6827; B60R 19/34; B60R 19/18; B60R 19/26; B62D 21/152; F16F 7/12
USPC .......................... 293/133, 132, 155; 188/377; 296/187.03
See application file for complete search history.

(56) References Cited

U.S. PATENT DOCUMENTS 3,412,628 A * 11/1968 De Gain ........................... 74/492
4,190,276 A * 2/1980 Hirano et al. ................. 293/133
4,194,763 A * 3/1980 Reidelbach et al. .......... 280/784
5,431,445 A * 7/1995 Wheatley ...................... 280/784
5,853,195 A * 12/1998 Le et al. ........................ 280/784
5,913,565 A * 6/1999 Watanabe ................. 296/187.03
6,174,009 B1 * 1/2001 McKeon ....................... 293/133
6,302,476 B1 * 10/2001 Larsson et al. ............. 296/187.1

(Continued)

FOREIGN PATENT DOCUMENTS

| DE | 102004002948 A1 | 8/2005 |
| JP | 52123926 U | 9/1977 |
| JP | 8276804 A | 10/1996 |

*Primary Examiner* — Kiran B Patel
(74) *Attorney, Agent, or Firm* — R. Neil Sudol; Henry D. Coleman

(57) ABSTRACT

A shock absorber for motor vehicles, comprising: a deforming body (2) comprising a first portion (3) and a second portion (4) which are fixed to one another such as to identify a tubular member (5) which has a first axis and comprises a first wall (6) and a second wall (7) adjacent to one another, which intersect to identify an edge (8), each portion (3, 4) comprising a half-shell (9) and two fixing tabs (10) arranged respectively at opposite ends of the half-shell (9), at least a portion (3, 4) comprising at least a bead (11, 12) which develops along a perpendicular development with respect to the first axis. The bead (11, 12) develops continuously at least along a part of the first wall (6) and at least along a part of the second wall (7) of the tubular member (5), following at least the edge (8) identified between the first wall (6) and the second wall (7), the bead (11, 12), when it follows the first wall (6), being orientated projecting with respect to the zone of the external surface of the first wall (6) which surrounds the bead (11, 12), the bead (11, 12), when following the second wall (7), being orientated retracted with respect to the zone of the external surface of the second wall (7) which surrounds the bead (11, 12), the bead (11, 12), at the edge (8), varying orientation thereof between projecting and retracted.

7 Claims, 6 Drawing Sheets

(56) References Cited

U.S. PATENT DOCUMENTS

| | | | |
|---|---|---|---|
| 6,474,709 B2 * | 11/2002 | Artner | 293/133 |
| 6,595,502 B2 * | 7/2003 | Koch et al. | 267/139 |
| 6,808,215 B2 * | 10/2004 | Sakuma et al. | 293/102 |
| 6,820,924 B2 * | 11/2004 | Caliskan et al. | 296/187.03 |
| 6,863,321 B2 * | 3/2005 | Jonsson et al. | 293/102 |
| 6,926,325 B2 * | 8/2005 | Frank | 293/133 |
| 6,929,297 B2 * | 8/2005 | Muller et al. | 293/133 |
| 6,971,691 B1 * | 12/2005 | Heatherington et al. | 293/102 |
| 7,389,860 B2 * | 6/2008 | Abu-Odeh et al. | 188/377 |
| 7,407,219 B2 * | 8/2008 | Glasgow et al. | 296/187.03 |
| 7,793,996 B2 * | 9/2010 | Karlander | 293/133 |
| 7,871,122 B2 * | 1/2011 | Salomonsson | 296/187.03 |
| 8,020,906 B2 * | 9/2011 | Schmid et al. | 293/133 |
| 8,210,601 B2 * | 7/2012 | Terada et al. | 296/187.09 |
| 8,354,175 B2 * | 1/2013 | Impero | 428/593 |
| 8,459,726 B2 * | 6/2013 | Tyan et al. | 296/187.03 |
| 8,585,129 B2 * | 11/2013 | Mori | 296/187.09 |
| 8,641,129 B2 * | 2/2014 | Tyan et al. | 296/187.03 |
| 8,857,894 B2 * | 10/2014 | Grall | 296/187.03 |
| 2002/0113447 A1 * | 8/2002 | Frank | 293/133 |
| 2005/0179268 A1 * | 8/2005 | Kollaritsch et al. | 293/133 |
| 2006/0237976 A1 * | 10/2006 | Glasgow et al. | 293/132 |
| 2006/0249342 A1 * | 11/2006 | Canot et al. | 188/377 |
| 2008/0036242 A1 * | 2/2008 | Glance et al. | 296/187.09 |
| 2008/0238146 A1 * | 10/2008 | Nusier et al. | 296/193.09 |
| 2009/0026777 A1 | 1/2009 | Schmid et al. | |
| 2011/0012389 A1 | 1/2011 | Kanaya et al. | |

* cited by examiner

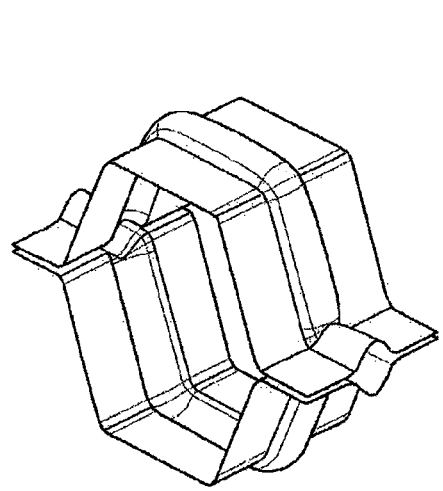
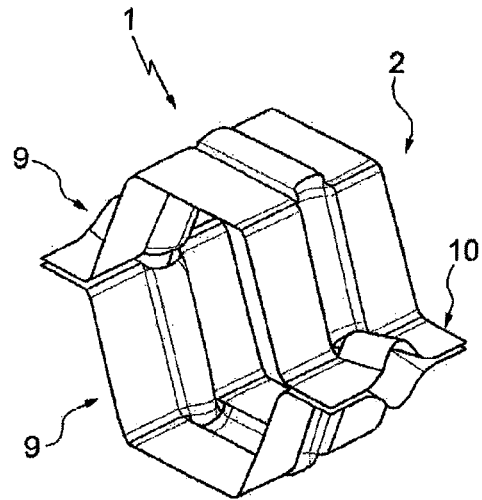
FIG.3C  FIG.4C
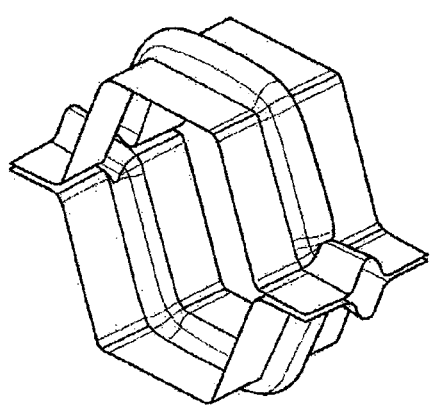
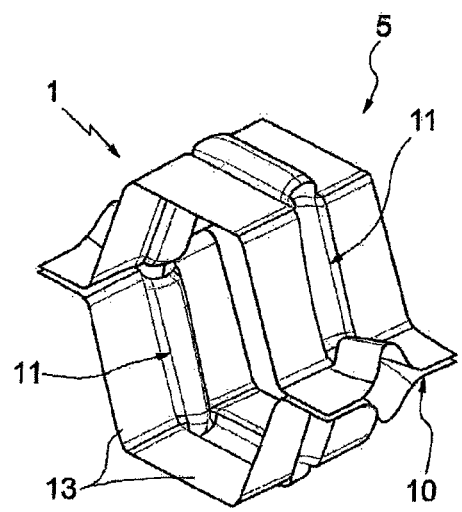
FIG.3D  FIG.4D

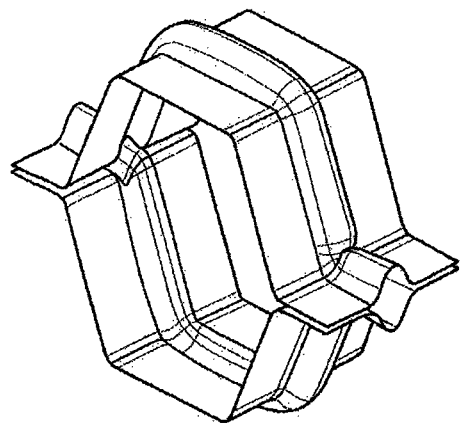
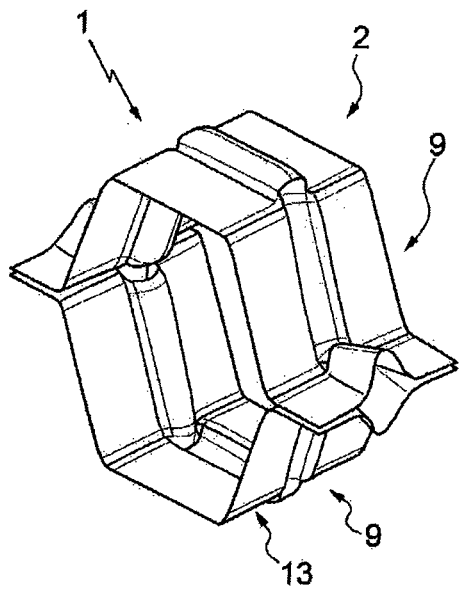
FIG.3E  FIG.4E
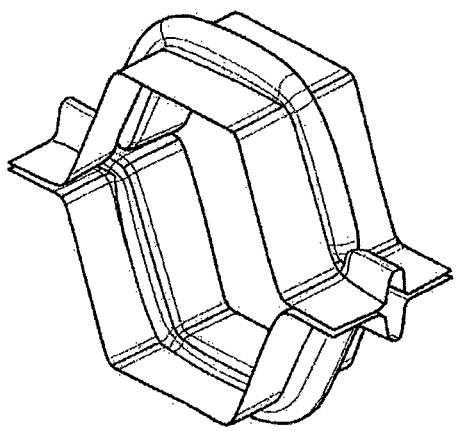
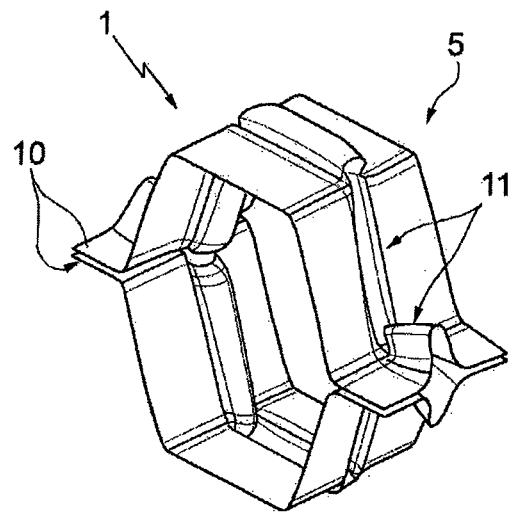
FIG.3F  FIG.4F

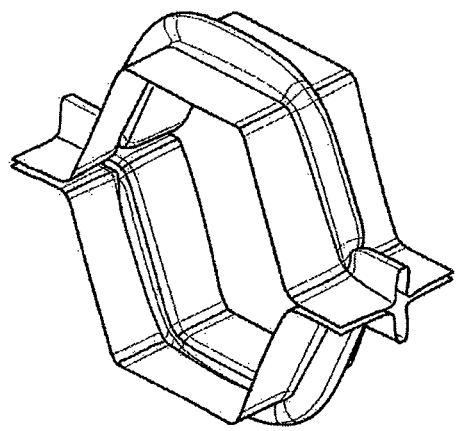
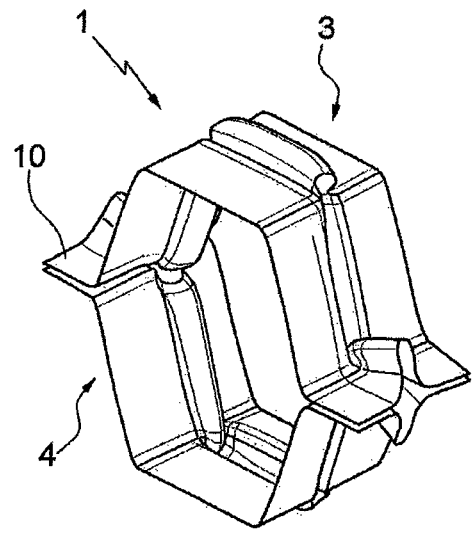
FIG.3G  FIG.4G
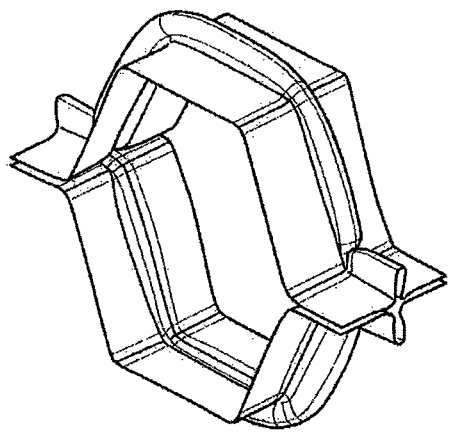
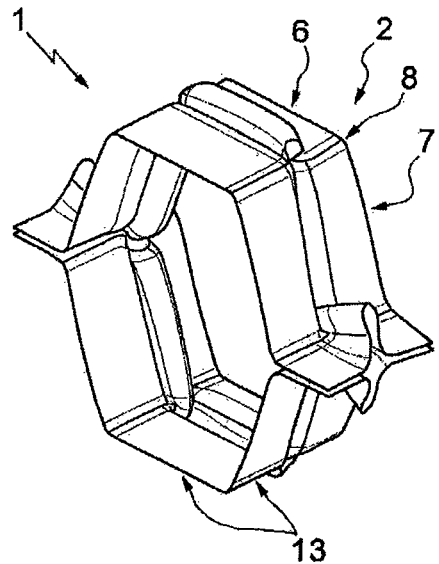
FIG.3H  FIG.4H

SHOCK ABSORBER FOR MOTOR VEHICLES

FIELD OF THE INVENTION

The present invention relates to the technical sector of shock absorbers for motor vehicles, known as "crash boxes".

DESCRIPTION OF THE PRIOR ART

As known, crash boxes are usually interposed between the front strut of a motor vehicle and the relative front cross beam, and in some cases, the crash boxes are also fixed to the rear cross beams.

Crash boxes comprise a deforming body configured such as to deform when subjected to a compressive stress of a certain entity, for example, an impact; the function of the crash box is such that, for so-called "low speed" impacts, the kinetic energy at the moment of impact is converted into deformation energy of the crash box in order to safeguard the integrity of the vehicle structure.

The state of the art comprises a shock absorber for motor vehicles in which the deforming body is provided with two opposite portions that are also fixed to one another, identifying a tubular member having an elongate development and exhibiting a plurality of intersecting walls that together identify corresponding edges; each portion comprises a half-shell and two mounting tabs disposed respectively at the ends of the half-shell; at least a portion may be provided with at least a bead which extends along a perpendicular path to the longitudinal axis of the tubular member, which bead is shaped such as to guide the plastic deformation of the deforming body and to regulate the amount of energy required in order to produce a certain degree of deformation of the deforming body as a result of an impact.

Each portion can be obtained by bending (or also by pressing) of a strip of sheet metal to obtain five walls, of which two are end walls, aligned with each other, i.e. lying on a same plane, conforming two fixing tabs, while the remaining three internal walls are angled with respect to one another such as to form a geometric figure, for example, a square or a hexagon, when the two above-mentioned portions are fixed to one another at the mounting tabs. The tubular member that is obtained can for example conform a hexagonal cell formed by six interior walls, i.e. three inner walls for each portion, and lateral projections each constituted by two fixing tabs, opposite and joined together for example by spot welding.

The walls are flat. Each portion, in general, can conform a plurality of half-shells, so that the tubular member can be formed by a plurality of flanked hexagonal cells, for example.

The bead is a kind of channel, having a concavity of a given depth, obtainable by deep-drawing compression of the sheet.

The crash box is installed in the motor vehicle in such a way that the longitudinal axis of the tubular member coincides with the deformation direction in the event of a frontal impact.

The beads may be provided in a given number, flanked and parallel to each other, on the walls of the tubular member; these beads also develop up to reaching the entire width of the wall on which they are integrated.

As is known, the efficiency of a crash box depends on the ratio between the mean force required to achieve a certain degree of crushing in the deformation direction and the maximum force absorbed during the crushing phase; the closer this ratio is to being unitary, the more efficient the crash box.

The use of beads has been shown to render an improvement in the efficiency of the crash box.

SUMMARY OF THE INVENTION

The aim of the present invention consists in devising a new-concept crash box having optimum efficiency.

A shock absorber or crash box for motor vehicles comprises, in accordance with the present invention, a deforming body comprising a first half shell and a second half shell which are opposite and fixed to one another to form a tubular member having a longitudinal axis. The first half-shell and the second half shell each have two fixing tabs or flanges extending along opposite edges of the respective half shell and parallel to the longitudinal axis. The fixing tabs or flanges of said first half shell are juxtaposed and connected to respective ones of the fixing tabs or flanges of the second half shell. The first half shell and the second half shell each further comprise a plurality of walls which are adjacent to and contiguous with one another along respective intersection edges extending parallel to the axis. At least one of the first half shell and the second half shell is formed with at least one energy-absorbing deformation bead extending in a plane oriented perpendicularly to the axis, the bead including at least one first portion projecting outwardly away from the axis and at least one second portion projecting inwardly toward the axis.

In the tract of the bead that is at the edge, advantageously no accumulation, interference or co-penetration of material of the deforming body occurs during the crushing of the crash box; in fact, the bead varies its orientation at the corner, between projecting and retracting. An accumulation, interference or copenetration of material of the deforming body would occur, however, if the bead did not vary the orientation thereof, remaining projecting or retracted.

The crushing of the crash box therefore proceeds with an ordered deformation, that is to say with an accordion-like deformation; in this way, the crash box reacts to the crushing with a less fluctuating and therefore more constant force, which maximizes the efficiency of the crash box.

In addition, the deformation of the material of the deforming body occurs in a predictable manner in the section of the bead that is located at the edge: this enables a more accurate calculation of the deformation that the crash box would suffer if subjected to an impact, that is to say the way in which it would collapse during the instants subsequent to the impact, which enables the crash box to be more accurately designed with respect to known inventions.

Therefore beads of greater length can be designed than those present in the prior art crash boxes. In fact, a bead may involve two or more walls of each portion of the deforming body or develop along a path that includes the entire width of the relative portion on which the bead itself is incorporated, i.e. along the fixing tabs and the walls of the half-shell. In this way, it is advantageously possible to guide the plastic deformation of the deforming body more precisely and more accurately adjust the amount of energy required to produce a certain degree of deformation of the deforming body as a result of an impact.

BRIEF DESCRIPTION OF THE DRAWINGS

Specific embodiments of the invention will be described in the following, according to what is set out in the claims and with the aid of the accompanying tables of drawings, in which:

FIGS. 3A-3H are perspective views of a test crash box at instants following an impact (compressive stress) acting along the longitudinal axis of the crash box;

FIGS. 4A-4H are perspective views of a crash box of a second embodiment of the invention at instants following an impact (compressive stress) acting along the longitudinal axis of the crash box;

DESCRIPTION OF PREFERRED EMBODIMENTS

Figure 1:
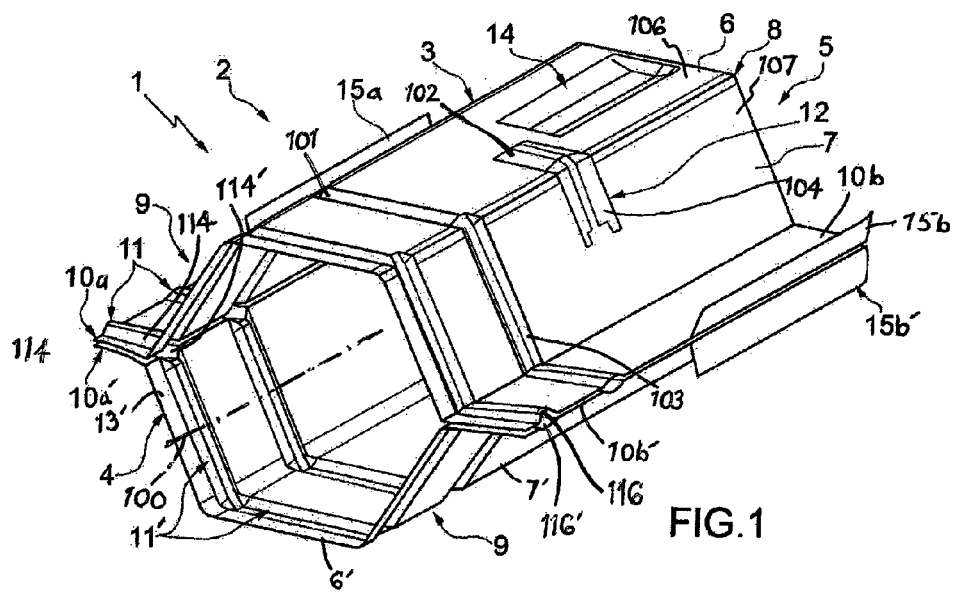
FIGS. 1, 2 are two perspective views of a crash box of the present invention, according to a first embodiment.

With reference to FIGS. 1, 2, 4A-4H, (1) denotes in its entirety a crash box, object of the present invention.

The crash box (1) comprises: a deforming body (2) configured such as to deform if subjected to an impact of a certain intensity, the deforming body (2) comprising a first portion (3) and a second portion (4) which are opposite and fixed to one another such as to identify a tubular member (5) which has a longitudinal first axis 100. The tubular member and particularly portion 3 thereof comprises a first wall (6) and a second wall (7) adjacent to one another and contiguous along an intersection edge (8).

Each portion (3, 4) comprises a half-shell and two respective fixing tabs or flanges (10a, 10b, 10a', 10b') extending parallel to axis 100 and arranged respectively alone opposite edges of the half-shell, at least one portion (3) comprising at least one energy-absorbing deformation bead (11, 12) which is disposed in a plane perpendicular with respect to the first axis 100, which bead (11, 12) is conformed such as to guide the plastic deformation of the deforming body (2) and such as to regulate a quantity of energy required for producing a certain degree of deformation of the deforming body (2) following an impact.

The bead (11, 12) develops continuously at least along a part of the first wall (6) and at least along a part of the second wall (7) of the tubular member (5), and overlaps or traverses at least the edge (8) between the first wall (6) and the second wall (7) A portion (101,102) of the bead (11, 12), disposed on or in the first wall (6), projects outwardly from the external surface 106 of the first wall (6) and away from the longitudinal axis 100. Another portion (103, 104) of the bead (11, 12), disposed on or in the second wall (7), is recessed and projects inwardly from the external surface 107 of the second wall (7) and towards the longitudinal axis 100. The projecting portion (101, 102) and the recessed portion (103,104) of the bead (11, 12) meet at and are contiguous with one another at the intersection edge (8), so that the bead (11, 12) has a varying orientation between projecting and retracted.

By "external surface" of the first wall (6) or the second wall (7) is meant the surface facing outwardly with respect to the tubular member (5); this external surface is opposite the internal surface of the first wall (6) or the second wall (7), which internal surface faces and defines the internal volume, together with the internal surfaces of the remaining walls (13) of the tubular member (5).

Figure 2:
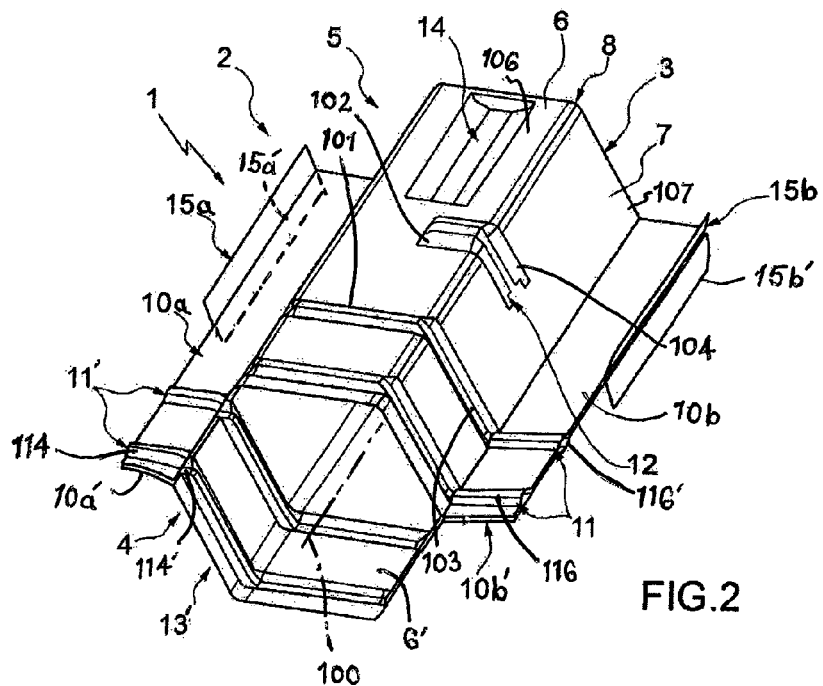

A bead of the above-described type is illustrated by way of example in the crash box (1) of FIGS. 1, 2 and denoted by reference numeral (12).

Each body portion (3, 4) can be formed in the same way. The one body portion (3) is obtained by folding (or also by pressing) of a strip of sheet metal to obtain three walls (6, 7, 13) the two fixing tabs or flanges (10a, 10b), which are aligned with one another, i.e. lying on a same plane, while the three walls (6, 7, 13) are angled to one another to form a geometrical figure, in the illustrated example a hexagon, when the two body portions (3, 4) are fixed to one another at the fixing tabs or flanges (10a, 10b, 10a', 10b'). The tubular member (5) that is obtained can for example form a hexagonal cell having six walls (6, 7, 13, 6', 7', 13'), i.e. three walls (6, 7, 13) of one body portion (3) and three walls (6', 7', 13') of the other body portion (4), and further having lateral projections each constituted by two pairs of fixing tabs (10a, 10b and 10a', 10b') opposite to one another and joined together for example by spot welding.

The walls (6, 7, 13 and 6', 7', 13') of each body portion (3, 4) are flat. Each portion (3, 4), in general, can form a plurality of half-shells (an embodiment not shown in the figures), so that when the two half shells or body portions (3, 4) are fixed to one another an equal number of tubular members (5) are identified, flanked and each having, for example, a hexagonal cell profile, or square or octagonal, etc.

The bead (11, 12) is a kind of channel, having a concavity of given depth, obtainable by compression of the sheet by deep drawing.

The crash box (1) is installed in the motor vehicle (not shown) in such a way that the longitudinal axis 100 (first axis) of the tubular member (5) coincides with the direction of deformation in the event of a frontal impact.

The beads (11, 11', 12) may be several, located side by side and parallel to one another, on the walls (6, 7, 13, 6', 7', 13') of the tubular member (5).

The crash box (1) shown in FIGS. 1, 2 comprises, for each portion (3, 4), two beads (11, 11') situated side by side and parallel; each of the beads (11, 11') extends along a path that includes the entire width of the relative portion (3, 4) on which the bead (11, 11') itself is incorporated, i.e. along the fixing tabs or flanges (10a, 10b; 10a', 10b') and the walls (6, 7, 13; 6', 7, 13') of the respective half-shell (3, 4). In this way it is advantageously possible to guide the plastic deformation of the deforming body (2) better, and more accurately regulate the amount of energy required to produce a certain degree of deformation of the deforming body (2) as a result of an impact.

When the first portion (3) is fixed to the second portion (4) such as to locate the tubular member (5), then a fixing tab or flange (10a, 10b) of the first portion (3) faces a corresponding fixing tab (10a', 10b') of the second portion (4).

The beads (11, 11') of the first portion (3) and the second portion (4) are preferably arranged such as to be facing one another, as shown in FIGS. 1, 2, 4A-4H; in particular, these beads (11,11') include portions 114, 116 on half shell 3 and portions 114' and 116' on half shell 4 that are oriented projectingly at the fixing tabs (10a, 10b, 10a', 10b'), such as to identify a channel on each side of the deforming body (2) which is closed above and below by the beads (11, 11').

At least one portion (3, 4) of the body of deformation (2) may comprise at least one additional bead (14) which develops parallel to the first axis 100 in order to increase the resistance to deformation of the deforming body (2) (FIGS. 1, 2). At least one fixing tab (10a, 10b, 10a', 10b') can exhibit a free end that is folded, forming a fold or folded flange extension (15a, 15b, 15a', 15b') to increase the resistance to deformation of the deforming body (2) (FIGS. 1, 2).

The fold or folded flange extension (15a, 15b, 15a', 15b') is preferably substantially perpendicular to the remaining part of the fixing tab or flange (10a, 10b, 10a', 10b').

FIGS. 3A-3H are perspective views of a "test" crash box in successive instants during an impact, and thus to a compressive stress, acting along the longitudinal axis 100 (first axis) of the crash box; the crash box illustrated herein is not part of the present invention and is not known. The test crash box was used for the purposes of a comparative analysis with the crash box (1) according to the second embodiment, shown in FIGS. 4A-4H, to highlight the greater efficiency of the latter crash box. For the purposes of this comparison, the magnitude of the impact and the direction in which the corresponding compressive stress acts (along the longitudinal axis of the crash box 1) are the same for both the test crash box of FIGS. 3A-3H and the crash box (1) of FIGS. 4A-4H that is the object of the present invention.

Figures 3A, 4A:
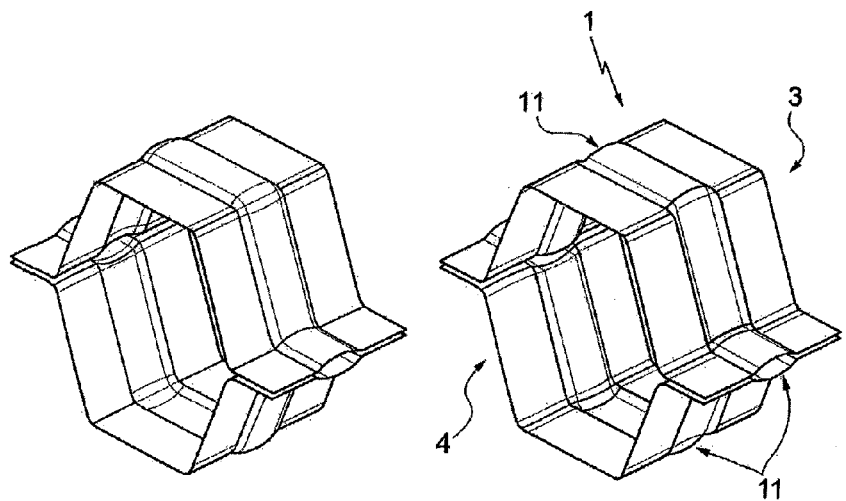

FIGS. 3A, 4A illustrate the crash box at time instant: about 0.5 milliseconds.

Figures 3B, 4B:
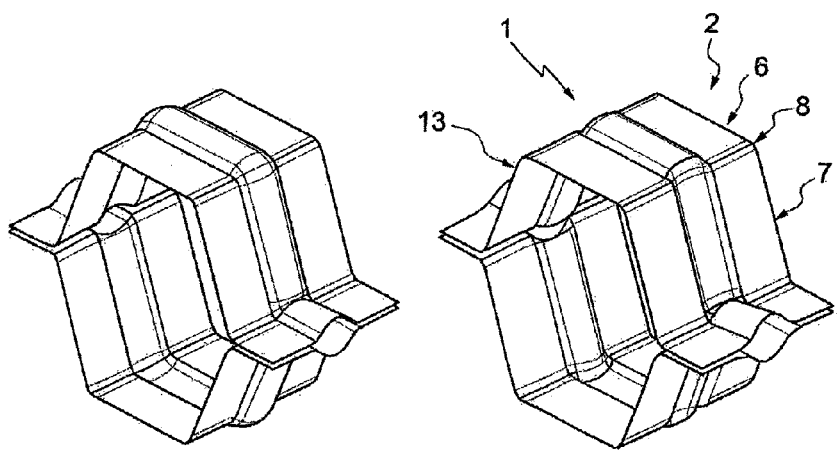

FIGS. 3B, 4B illustrate the crash box at time instant: about 1.5 milliseconds.

FIGS. 3C, 4C illustrate the crash box at time instant: about 2 milliseconds.

FIGS. 3D, 4D illustrate the crash box at time instant: about 2.5 milliseconds.

FIGS. 3E, 4E illustrate the crash box at time instant: about 3 milliseconds.

FIGS. 3F, 4F illustrate the crash box at time instant: about 3.5 milliseconds.

FIGS. 3G, 4G illustrate the crash box at time instant: about 4 milliseconds.

FIGS. 3H, 4H illustrate the crash box at the time instant: about 4.5 milliseconds.

Figure 5:
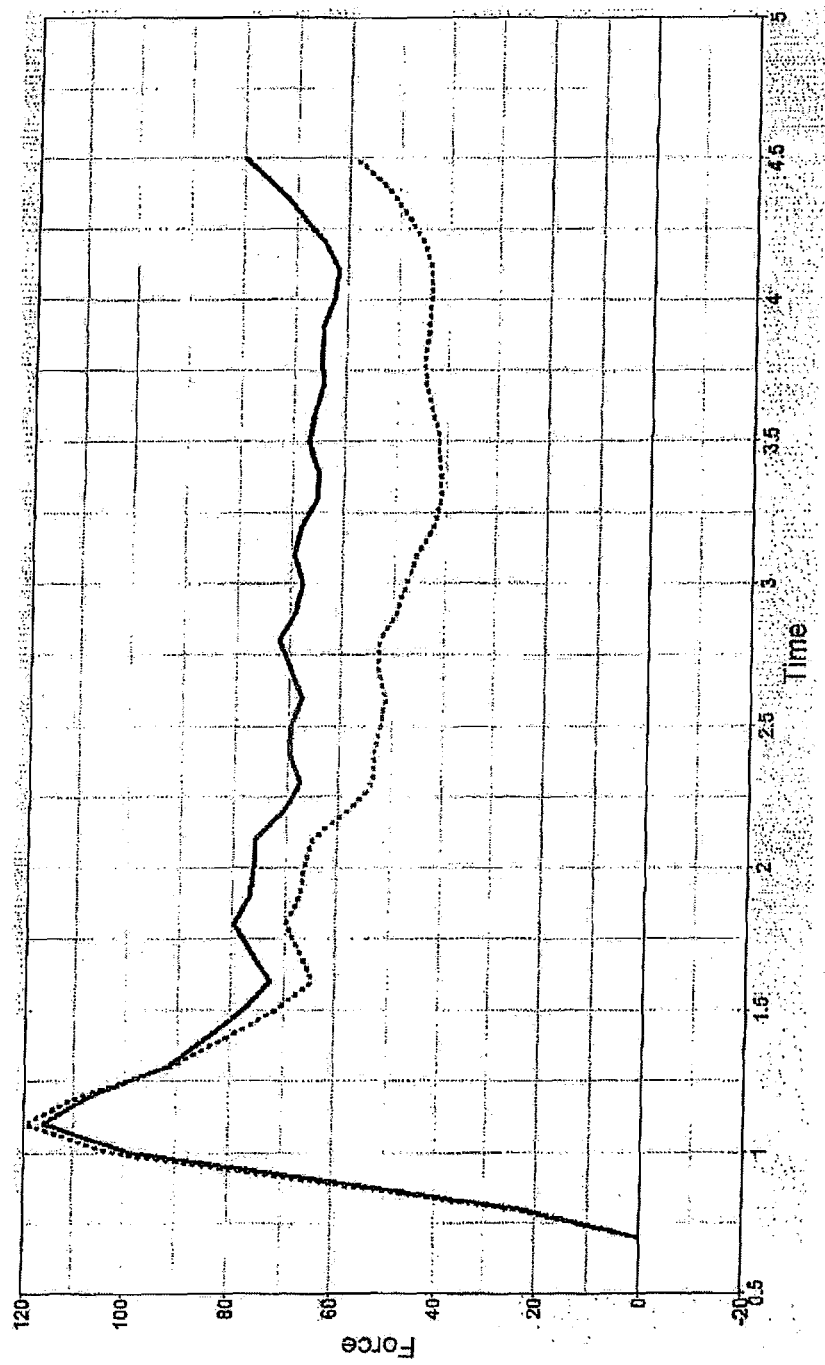
FIG. 5 illustrates a graph showing a progression over time of the force with which the crash box of FIGS. 3A-3H and the crash box of FIGS. 4A-4H reacts to an impact.

FIG. 5 shows, in a broken line, the time course of the force with which the crash box of FIGS. 3A-3H reacts to a shock and reports, in a continuous line, the time course of the force with which the crash box (1) of FIGS. 4A-4H reacts to a shock.

As can be seen in FIG. 5, the crash box (1) of the invention reacts to crushing with a less fluctuating and therefore more constant force, which maximizes the efficiency of the crash box (1) itself.

It is understood that the above has been described by way of non-limiting example, and that therefore possible constructional variants are within the protective scope of the present invention.

The invention claimed is:

1. A shock absorber for motor vehicles, comprising:

a deforming body comprising a first half shell and a second half shell which are opposite and fixed to one another to form a tubular member having a longitudinal axis, said first half shell and said second half shell each having two fixing tabs or flanges extending along opposite edges of the respective half shell and parallel to said longitudinal axis, the fixing tabs or flanges of said first half shell being juxtaposed and connected to respective ones of the fixing tabs or flanges of the second half shell, the first half shell and the second half shell each further comprising, further to the two fixing tabs or flanges, a plurality of walls which are adjacent to and contiguous with one another along at least one intersection edge extending parallel to said axis, each of said first half shell and said second half shell being formed with at least one energy-absorbing deformation bead extending in a plane oriented perpendicularly to said axis and which extends on all the walls of the plurality of walls and on the fixing tabs or flanges, each said bead including as many bead portions as are the walls of the plurality of walls, said bead portions including at least one first bead portion projecting outwardly away from said axis and at least one second bead portion projecting inwardly toward said axis, the bead portions of said first half shell being coplanar with and opposed to bead portions of said second half shell, said first bead portion and said second bead portion being provided on adjacent ones of said walls and being disposed adjacent to and contiguous with one another at said at least one intersection edge, said bead portions being arranged so that there is alternation between bead portions projecting outwardly from the axis and bead portions projecting inwardly toward said axis, each bead including, in addition to the bead portions formed on the plurality of walls, bead sections formed on the fixing tabs or flanges of each of said first half shell and said second half shell, the bead sections being coplanar and contiguous with at least one bead portion of the respective deformation bead of the respective half shell, the bead sections on the fixing tabs or flanges of one of said first half shell and said second half shell being disposed adjacent to the bead sections on the fixing tabs or flanges of the other of said first half shell and said second half shell, the bead sections on the fixing tabs or flanges of one of said first half shell and said second half shell projecting away from the fixing tabs or flanges of the other of said first half shell and said second half shell.

2. The shock absorber of claim 1, wherein the bead sections on the fixing tabs or flanges of one of said first half shell and said second half shell and the adjacent bead sections on the fixing tabs or flanges of the other of said first half shell and said second half shell form channels.

3. The shock absorber of claim 1, wherein at least one of said first half shell and said second half shell is provided with at least one additional bead that extends parallel to said axis to thereby increase resistance to deformation of said body.

4. The shock absorber of claim 1, wherein at least one of the fixing tabs or flanges is provided along an outer edge or free end with a folded flange extension extending at an angle to the respective fixing tab or flange.

5. The shock absorber of claim 4, wherein said folded extension is oriented substantially perpendicularly to said at least one of the fixing tabs or flanges.

6. The shock absorber of claim 1, wherein said first half shell and said second half shell are conformed, when fixed to one another, to define one or more hexagonal cells.

7. The shock absorber of claim 1, wherein each of said first half shell and said second half shell comprises a bent metal sheet.

* * * * *